United States Patent
Xia et al.

(10) Patent No.: US 11,204,592 B2
(45) Date of Patent: Dec. 21, 2021

(54) GRID LOAD INTERACTIVE CONTROL METHOD AND TERMINAL BASED ON ADAPTIVE LOAD CHARACTERISTICS, AND STORAGE MEDIUM

(71) Applicants: STATE GRID JIANGSU ELECTRIC POWER CO., LTD, Jiangsu (CN); JIANGSU FRONTIER POWER TECHNOLOGY CO., LTD., Jiangsu (CN); NANJING CHSCOM Electrical Technology Co., Ltd., Jiangsu (CN); JIANGSU KENENG Electric Power Engineering Consulting Co., Ltd., Jiangsu (CN)

(72) Inventors: Yong Xia, Jiangsu (CN); Yaohong Li, Jiangsu (CN); Ting Zhou, Jiangsu (CN); Chengliang Wang, Jiangsu (CN); Li Zhang, Jiangsu (CN); Cheng Li, Jiangsu (CN); Hongxing Wang, Jiangsu (CN); Yujun Lu, Jiangsu (CN); Junxia Qian, Jiangsu (CN); Hao Chen, Jiangsu (CN); Jiajia Cao, Jiangsu (CN); Ning Wang, Jiangsu (CN); Yonggao Ge, Jiangsu (CN)

(73) Assignees: STATE GRID JIANGSU ELECTRIC POWER CO., LTD; JIANGSU FRONTIER POWER TECHNOLOGY CO., LTD.; NANJING CHSCOM ELECTRICAL TECHNOLOGY CO., LTD.; JIANGSU KENENG ELECTRIC POWER ENGINEERING CONSULTING CO., LTD.

( * ) Notice: Subject to any disclaimer, the term of this patent is extended or adjusted under 35 U.S.C. 154(b) by 373 days.

(21) Appl. No.: 16/373,997

(22) Filed: Apr. 3, 2019

(65) Prior Publication Data
US 2020/0251926 A1  Aug. 6, 2020

(30) Foreign Application Priority Data

Feb. 1, 2019 (CN) .......................... 201910105557.4

(51) Int. Cl.
    *G05B 19/042* (2006.01)
(52) U.S. Cl.
    CPC .... *G05B 19/042* (2013.01); *G05B 2219/2639* (2013.01)
(58) Field of Classification Search
    None
    See application file for complete search history.

(56) References Cited

U.S. PATENT DOCUMENTS

| | | | | |
|---|---|---|---|---|
| 2002/0173927 A1* | 11/2002 | Vandiver | ............. | G06F 11/2294 702/122 |
| 2007/0136013 A1* | 6/2007 | Premerlani | ............ | G01R 29/18 702/75 |

(Continued)

FOREIGN PATENT DOCUMENTS

| | | |
|---|---|---|
| CN | 102354987 A | 2/2012 |
| CN | 105203864 A | 12/2015 |

(Continued)

OTHER PUBLICATIONS

You, Haibo & Vittal, V. & Liu, Chen-Ching & Adapa, Rambabu. (2002). An Intelligent Adaptive Load Shedding Scheme. (Year: 2002).*

(Continued)

*Primary Examiner* — Kenneth M Lo
*Assistant Examiner* — Istiaque Ahmed
(74) *Attorney, Agent, or Firm* — McDonald Hopkins LLC (57) ABSTRACT

The provided materials are a grid load interactive control method and terminal based on adaptive load characteristics and a storage medium. The method includes: receiving a test presetting message sent by a master station and sending (Continued)

message reply information to the master station; parsing the test presetting message to obtain a test presetting instruction; building a test environment and generating a virtual action exit in the test environment when the test presetting instruction generates a record; and sending instruction response including the record to the master station so as to cause the master station to determine whether a test is successful according to the record.

13 Claims, 3 Drawing Sheets

(56) References Cited

U.S. PATENT DOCUMENTS

| | | | | |
|---|---|---|---|---|
| 2013/0035800 | A1* | 2/2013 | Kulathu | H02J 13/00034 700/295 |
| 2013/0123998 | A1* | 5/2013 | King | G06F 1/30 700/292 |
| 2014/0167528 | A1* | 6/2014 | Lancaster | H02H 11/008 307/130 |

FOREIGN PATENT DOCUMENTS

| | | |
|---|---|---|
| CN | 106099936 A | 11/2016 |
| CN | 106160229 | 11/2016 |
| CN | 106340951 | 1/2017 |
| CN | 107562036 | 1/2018 |
| CN | 107681783 A | 2/2018 |
| CN | 108258680 | 7/2018 |
| CN | 108804843 | 11/2018 |
| CN | 108964043 | 12/2018 |

OTHER PUBLICATIONS

Li, H., Liu, H., Yuan, Y. and Zhou, Q. (2019), Large-scale source-grid-load friendly interactive system introduction and real load shedding verification test technology. The Journal of Engineering, 2019: 2649-2653. https://doi.org/10.1049/joe.2018.8812 (Year: 2019).*

Patent Cooperation Treaty (PCT), International Search Report and Written Opinion for Application PCT/CN2019/077488 filed on Mar. 8, 2019, dated Sep. 27, 2019, International Searching Authority, CN.

Liu et al., "The Actual Load Shedding Verification Test Technology of Large-scale Source-Grid-Load" Friendly Interactive System Introduction. State Grid Jiangsu Electric Power Research Institute, Nanjing 211103, China.

Chinese Office Action dated Dec. 28, 2020; Chinese Patent Application No. 201910105557.4.

* cited by examiner

GRID LOAD INTERACTIVE CONTROL METHOD AND TERMINAL BASED ON ADAPTIVE LOAD CHARACTERISTICS, AND STORAGE MEDIUM

CROSS-REFERENCES TO RELATED APPLICATIONS

This application claims priority to a Chinese patent application No. 201910105557.4 filed on Feb. 1, 2019, the disclosure of which is incorporated herein by reference in its entirety.

TECHNICAL FIELD

Embodiments of the present invention relate to the technical field of intelligent control of power systems, and particularly relate to a grid load interactive control method and terminal based on adaptive load characteristics, and a storage medium.

BACKGROUND

A precision load shedding system for a large-scale source grid load collects current, voltage, frequency, active power, reactive power and switch position signals of multiple load lines in real time, and calculates the total sheddable load. In case of grid abnormalities such as frequency drop, power flow over-limit and short-time power imbalance, a master station issues millisecond-level, second-level or minute-level load shedding instructions according to a load shedding control strategy to realize the shedding control of multiple interruptible load lines. With the system construction and the continuous expansion and access of subsequent users, the number of terminals controlled by the master station is continuously increased. The new installed terminals shall be subjected to a load shedding verification test before operation. Usually, it is difficult to cut power of users without stopping their production activities, so the load shedding cannot be directly carried out. Generally, safety measures are made at both of the master station side and the terminal side. However, the safety measures at the master station side are often more complex, and the safety measures at the terminal side needs to be carried out in a door-to-door manner. The existing test method needs heavy workload. Meanwhile, terminals or master stations that have been operated in the early stage also need to be subjected to a load shedding verification simulation test after the terminals or master stations are upgraded for functional improvement.

Therefore, for large-scale users with dispersedly distributed interruptible loads, the safety measures of load shedding tests of the master station and the terminals are complex, and it is often difficult for the users to cut power and directly perform load shedding without stopping production activities and difficult to conduct safe operation.

SUMMARY

Embodiments of the present invention provide a grid load interactive control method and terminal based on adaptive load characteristics, and a storage medium, so as to solve the problems that the safety measures for load shedding tests of the master station and the terminal are complex and it is often difficult for the users to cut power and directly perform load shedding without stopping production activities and difficult to conduct safe operation for large-scale users with dispersedly distributed interruptible load.

To solve the above technical problems, the present disclosure adopts the following technical solution.

In a first aspect, embodiments of the present invention provide a grid load interactive control method based on adaptive load characteristics. The method is applied to a grid load terminal and includes:

receiving a test presetting message sent by a master station and sending message reply information to the master station, where the test presetting message includes a test presetting instruction;

parsing the test presetting message to obtain the test presetting instruction;

building a test environment and generating a virtual action exit under the test environment when the test presetting instruction to generates a record; and sending instruction response including the record to the master station so that the master station determines, according to the record, whether a test is successful or not.

Further, the method further includes:

receiving a direct power restoring instruction sent by the master station, where the direct power restoring instruction includes a control restoring instruction and a restoring reminding signal;

executing a shutter closing control according to the control restoring instruction if restoring power to a current line is allowed; and sending the restoring reminding signal to an alarm device if restoring power to the current line is not allowed, so that the alarm device sends alarm information.

Further, the method further includes:

receiving a power restoring delay instruction sent by the master station, where the power restoring delay instruction includes a preset delay time, a control restoring instruction and a restoring reminding signal;

resetting a timer and starting timing;

controlling the timer to stop timing when the time of the timer exceeds the preset delay time;

executing the shutter closing control according to the control restoring instruction if restoring power to the current line is allowed; and sending the restoring reminding signal to the alarm device if restoring power to the current line is not allowed, so that the alarm device sends the alarm information.

Further, the restoring reminding signal includes: a voice output signal and/or a control output signal.

Further, the method further includes:

receiving information of an interruptible load sent by an extension terminal through Generic Object Oriented Substation Event (GOOSE) communication; and sending a load shedding instruction to the extension terminal through GOOSE communication so that the extension terminal controls the interruptible load.

Further, the method further includes:

receiving the information of the interruptible load sent by a grid load subunit; and sending the load shedding instruction or a load restoring instruction to the grid load subunit so that the grid load subunit controls the interruptible load.

Further, the method further includes:

collecting bus voltage and calculating grid frequency and frequency slip in real time;

determining the change of the grid frequency; and controlling load shedding through a sequential-round load shedding control mode or an independent-round load shedding control mode if the grid frequency drops.

Further, the sequential-round load shedding control mode includes: adopting the sequential-round load shedding control with different frequency drop depths and frequency slip speeds according to a preset grid frequency setting value and a frequency slip setting value; and the independent-round load shedding control mode includes: setting an independent frequency action setting value for each round according to the frequency drop depth and setting multiple rounds of load shedding control for different frequency drop depths.

In a second aspect, embodiments of the present invention further provide a grid load interactive control terminal based on adaptive load characteristics. The device including: a test presetting module, a load restoration module, a control output module, a load collecting module and a frequency response control module.

The test presetting module is configured to: receive a test presetting message sent by a master station and send message reply information to the master station, where the test presetting message includes a test presetting instruction; parse the test presetting message to obtain the test presetting instruction; build a test environment and generate a virtual action exit under the test environment when the test presetting instruction generates a record; and send instruction response including the record to the master station so that the master station determines whether a test is successful or not according to the record.

The load restoration module is configured to: receive a direct power restoring instruction sent by the master station, where the direct power restoring instruction includes a control restoring instruction and a restoring reminding signal; execute a shutter closing control according to the control restoring instruction if restoring power to a current line is allowed; and send the restoring reminding signal to an alarm device if restoring power to the current line is not allowed, so that the alarm device sends alarm information. Alternatively, the load restoration module is configured to: receive a power restoring delay instruction sent by the master station, where the power restoring delay instruction includes a preset delay time, a control restoring instruction and a restoring reminding signal; reset a timer and start timing; control the timer to stop timing when the time of the timer exceeds the preset delay time; execute the shutter closing control according to the control restoring instruction if restoring power to the current line is allowed; and send the restoring reminding signal to the alarm device if restoring power to the current line is not allowed, so that the alarm device sends the alarm information.

The load collecting module is configured to receive information of an interruptible load sent by an extension terminal through GOOSE communication; or receive information of an interruptible load sent by a grid load subunit.

The control output module is configured to send a load shedding instruction to the extension terminal through GOOSE communication so that the extension terminal controls the interruptible load; or send the load shedding instruction or a load restoring instruction to the grid load subunit so that the grid load subunit controls the interruptible load.

The frequency response control module is configured to: collect bus voltage and calculate grid frequency and frequency slip in real time; determine the change of the grid frequency; and control load shedding through a sequential-round load shedding control mode or an independent-round load shedding control mode if the grid frequency drops.

In a third aspect, embodiments of the present invention further provide a computer readable storage medium, storing a computer program. The computer program, when executed by a processor, implements the grid load interactive control method based on adaptive load characteristics in the first aspect.

The grid load interactive control method based on adaptive load characteristics provided by embodiments of the present invention includes: receiving a test presetting message sent by a master station and sending message reply information to the master station; parsing the test presetting message to obtain the test presetting instruction; building a test environment and generating a virtual action exit under the test environment when the test presetting instruction generates a record; and sending instruction response including the record to the master station so that the master station determines whether a test is successful according to the record. The grid load interactive control method based on adaptive load characteristics provided by embodiments of the present invention supports large-scale test presetting, and can select different user terminals for batch testing. In an operating state, the test terminal will not send out a tripping exit and the testing is safe, so whether the test is successful or not can be directly verified, thereby achieving online, batch and safe testing, providing a convenient means for load shedding tests of new users, functional improvement and verification of the master station and the terminal and subsequent routine tests, and solving the problems that the safety measures for load shedding tests of the master station and the terminal are complex and it is often difficult for the users to cut power and directly perform load shedding without stopping production activities and difficult to conduct safe operation for large-scale users with dispersedly distributed interruptible load.

BRIEF DESCRIPTION OF DRAWINGS

To more clearly describe the technical solution in embodiments of the present invention, the drawings used in description of the embodiments of the present invention will be simply presented below. Apparently, the drawings in the following description are merely some embodiments of the present invention, and for the person having ordinary skill in the art, other drawings can also be obtained according to the contents of embodiments of the present invention and these drawings without any creative work.

DETAILED DESCRIPTION

The present disclosure will be further described below in detail in combination with drawings and embodiments. It can be understood that specific embodiments described herein are only used for explaining the present invention, not used for limiting the present invention. In addition, it shall be indicated that for ease of description, drawings only show some structures related to the present invention rather than all structures.

It should be noted that terms "system" and "network" in the present disclosure are often used interchangeably herein.

"And/or" mentioned in embodiments of the present invention refers to any and all combinations including one or more related listed items.

It should also be noted that the following embodiments of the present disclosure can be executed independently, or in combination with each other, which is not specifically limited in embodiments of the present invention.

Figure 1:
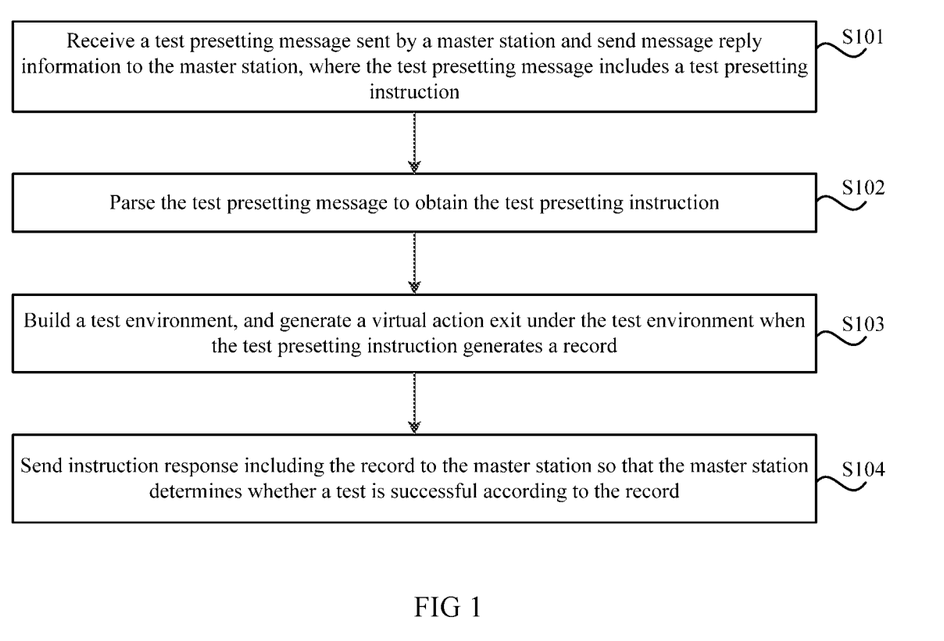
FIG. 1 is a flow chart illustrating a grid load interactive control method based on adaptive load characteristics according to an embodiment of the present invention.

Embodiments of the present invention provide a grid load interactive control method based on adaptive load characteristics. FIG. 1 is a flow chart illustrating a grid load interactive control method based on adaptive load characteristics according to an embodiment of the present invention. By referring to FIG. 1, the grid load interactive control method based on adaptive load characteristics in the embodiment of the present invention is applied to a grid load terminal and includes the following steps.

In step S101, a test presetting message sent by a master station is received and message reply information is sent to the master station, where the test presetting message includes a test presetting instruction.

Specifically, the master station may be provided with a preset test module that is configured to send the test presetting message to a large-scale test presetting module at the grid load terminal side. The grid load terminal receives the test presetting messages sent by the master station in batch, and sends message reply information to the master station to immediately complete message-level confirmation reply, so as to satisfy the quick response requirement of a power system.

In step S102, the test presetting message is parsed to obtain the test presetting instruction.

Specifically, the grid load terminal parses the received test presetting message to obtain the test presetting instruction included in the test presetting message.

In step S103, the test environment is built, a virtual action exit is generated under the test environment when the test presetting instruction generates a record.

Specifically, after confirming that the test presetting instruction is obtained, a test state is set and the test environment is built. Meanwhile, under the test environment, the virtual action exit is generated when the test presetting instruction generates the record. In the operating state, the grid load terminal does not send out a tripping exit, is tested safely, and generates a record to facilitate the generation of reply information.

In step S104, instruction response including the record is sent to the master station so that the master station determines whether a test is successful or not according to the record.

Specifically, the instruction response including the record is sent to the master station, so that the master station determines whether the test on a user is successful or not according to the reply information of the grid load terminal. With the method, whether the test is successful can be directly verified, and online, batch and safe testing can be achieved, thereby providing a convenient means for load shedding tests of new users, verification of functional improvement of the master station and the terminal, and subsequent routine tests. Further, solved are the problems of system batch tests under multiple modes, such as source grid load system upgrade, communication network upgrade and transformation, terminal system upgrade, new terminal access debugging and regular functional verification tests of the system.

The grid load interactive control method based on adaptive load characteristics provided by embodiments of the present invention includes: receiving a test presetting message sent by a master station and sending message reply information to the master station; parsing the test presetting message to obtain the test presetting instruction; building a test environment and generating a virtual action exit under the test environment when the test presetting instruction generates a record; and sending instruction response including the record to the master station so that the master station determines whether a test is successful according to the record. The grid load interactive control method based on adaptive load characteristics provided by embodiments of the present invention supports large-scale test presetting, and can select different user terminals for batch testing. In an operating state, the test terminal will not send out a tripping exit and the testing is safe, so whether the test is successful or not can be directly verified, thereby achieving online, batch and safe testing, providing a convenient means for load shedding tests of new users, functional improvement and verification of the master station and the terminal and subsequent routine tests. Further, solved are the problems that the safety measures for load shedding tests of the master station and the terminal are complex and it is often difficult for the users to cut power and directly perform load shedding without stopping production activities and difficult to conduct safe operation for large-scale users with dispersedly distributed interruptible load and safety and convenient of online tests as well as reliability of system operation are enhanced.

Figure 2:
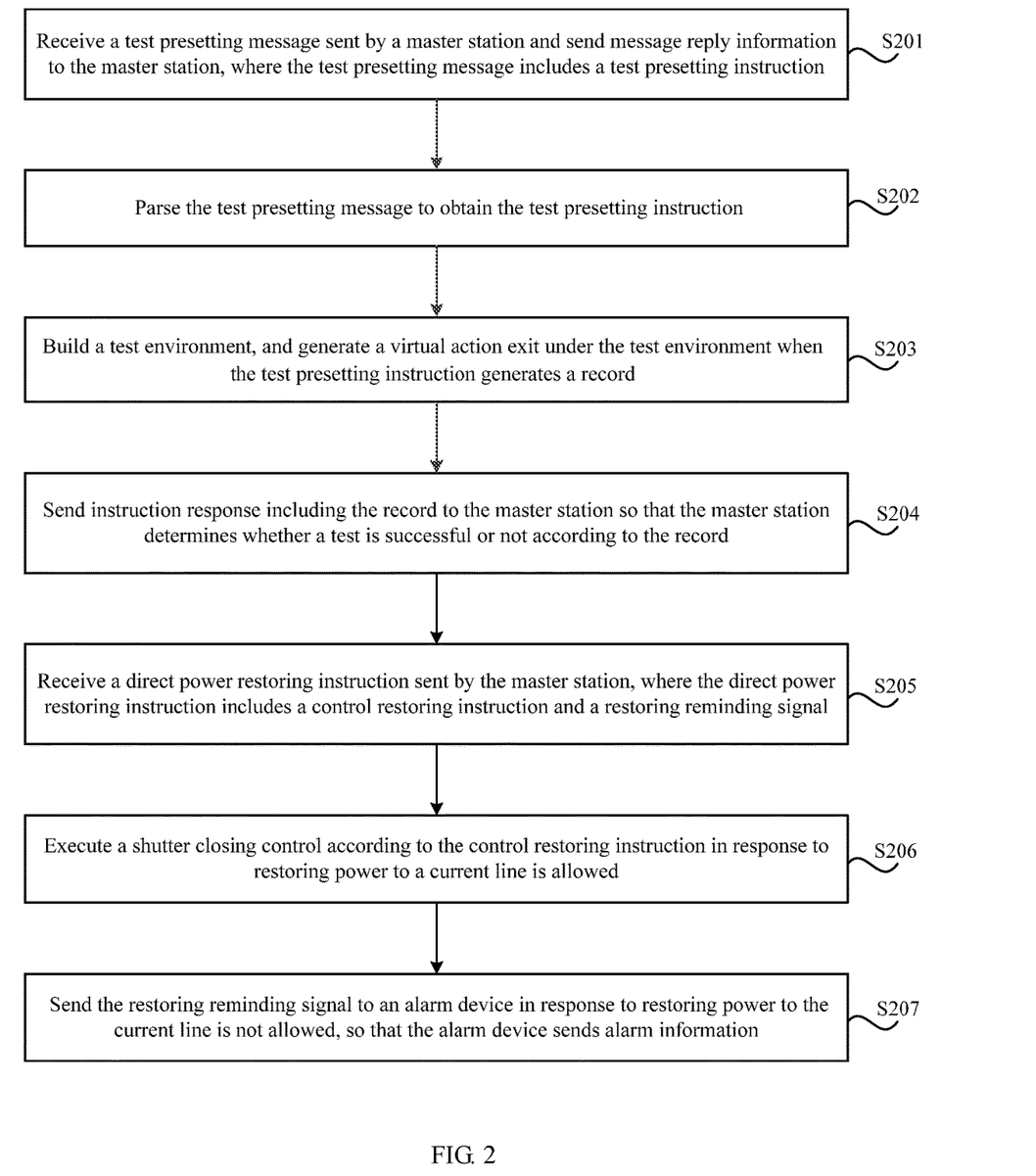
FIG. 2 is a flow chart illustrating another grid load interactive control method based on adaptive load characteristics according to an embodiment of the present invention.

FIG. 2 is a flow chart illustrating another grid load interactive control method based on adaptive load characteristics according to an embodiment of the present invention. Based on the above embodiments, by referring to FIG. 2, the grid load interactive control method based on adaptive load characteristics in the embodiment of the present invention includes the following steps.

In step S201, a test presetting message sent by a master station is received and message reply information is sent to the master station, where the test presetting message includes a test presetting instruction.

In step S202, the test presetting message is parsed to obtain the test presetting instruction.

In step S203, a test environment is built, a virtual action exit is generated under the test environment when the test presetting instruction generates a record.

In step S204, instruction response including the record is sent to the master station so that the master station determines whether a test is successful or not according to the record.

Steps S201 to S204 are similar to Steps S101 to S104 described in the above embodiment, and will not be repeated in detail herein for simplicity.

In step S205, a direct power restoring instruction sent by the master station is received, where the direct power restoring instruction includes a control restoring instruction and a restoring reminding signal.

Specifically, the master station includes a load restoration module. After system frequency returns to normal, the master station sends the direct power restoring instruction. The load terminal receives the control restoring instruction and the restoring reminding signal sent directly by the master station.

In step S206, a power shutter closing control is executed according to the control recovery instruction if restoring power to a current line is allowed.

Specifically, after receiving the restoring instruction and the restoring reminding signal, the load terminal executes the power shutter closing control on the line that allows direct power restoring without safety risk according to the control restoring instruction, i.e., according to a preset direct restoring soft strap and a direct restoring line matrix output, so as to satisfy strict requirements of partial loads of partial users for power restoring time.

In step S207, the restoring reminding signal is sent to an alarm device if restoring power to the current line is not allowed, so that the alarm device sends out alarm information.

Specifically, after receiving the restoring instruction and the restoring reminding signal, the load terminal sends to the alarm device the restoring reminding signal associated with the line that needs to be manually reset before power supply or the line not allowing direct restoring power according to the control restoring instruction, i.e., according to the preset direct restoring soft strap and the direct restoring line matrix output, so that the alarm device sends out the alarm information and ensures that power restoring is immediately executed manually after the restoring reminding signal is sent out.

In one or more embodiments, the restoring reminding signal includes: a voice output signal and/or a control output signal.

Specifically, for the line that needs to be manually reset before power supply or the line not allowing direct power restoring, the voice output signal and/or the control output signal is sent to the alarm device, so as to ensure that power restoring is immediately executed manually after the restoring reminding signal is sent.

In one or more embodiments, on the basis of the above embodiment, the method further includes the following steps. A power restoring delay instruction sent by the master station is received, where the power recovery delay instruction includes a preset delay time, a control restoring instruction and a restoring reminding signal. A timer is reset and timing is started; the timing of the timer is stopped when the time of the timer exceeds the preset delay time. The power shutter closing control is executed according to the control restoring instruction if restoring power to the current line is allowed. The restoring reminding signal is sent to the alarm device if restoring power to the current line is not allowed, so that the alarm device sends out the alarm information.

Specifically, after the master station configures the preset delay time and the control restoring instruction that enables the delay power restoring control, the delay power restoring instruction sent by the master station is received, i.e., the load shedding instruction sent by the master station is received. The preset timer is reset and the timing is started. The timing of the timer is stopped when the time of the timer exceeds the preset delay time. The power shutter closing control is executed on the line that allows direct power restoring without safety risk according to the control restoring instruction, i.e., according to a preset direct restoring soft strap and a direct restoring line matrix output. For the line that needs to be manually reset before power supply is restored or the line not allowing direct power restoring, the restoring reminding signal is sent to the alarm device, i.e., the voice output signal and/or the control output signal is sent to the alarm device, so that the alarm device sends out the alarm information, so as to ensure that power restoring is immediately executed manually after the restoring reminding signal is sent.

Exemplarily, the direct power restoring mode and the delay power restoring mode corresponding to the direct power restoring instruction and the delay power restoring instruction sent by the master station are received. The direct power restoring mode and the delay power restoring mode can be used independently or simultaneously. In an embodiment, the direct power restoring mode and the delay power restoring mode are used simultaneously, the load shedding instruction is generated, the direct power restoring instruction is faster than the delay power restoring instruction, the preset timer is stopped from timing upon receiving the direct power restoring instruction, the terminal exits from the delay power restoring mode and returns to a waiting state. If the direct power restoring instruction is slower than the delay power restoring instruction, the terminal exits from the direct power restoring mode after delay power restoring. The direct power restoring mode and the delay power restoring mode provide flexibility, selectivity and power consumption safety for rapid power restoring of load shedding of the user, and reflect the characteristics of grid load interaction. It should be indicated that, in the two power restoring modes, the time setting value of delay power restoring and the selected setting value of the power restoring mode are preset by the master station, and can be enabled by the load shedding instruction of the master station or other load shedding instructions. When any load shedding instruction is received by the preset delay power restoring timer, the timer will be reset and restarted.

The method provided by the present embodiment satisfies the strict requirements for power restoring time after power outage of partial productive loads, solves the problem of quick power restoring of load after load shedding, provides the direct power restoring mode and the delay power restoring mode, also provides a way to remind the users to restore the power by themselves for load lines whose power cannot be restored remotely and directly, and increases interaction and power restoring safety of the source grid load system.

In an embodiment, on the basis of the above embodiment, the method further includes: information of an interruptible load sent by an extension terminal is received through Generic Object Oriented Substation Event (GOOSE) communication; and a load shedding instruction is sent to the extension terminal through GOOSE communication so that the extension terminal controls the interruptible load.

Specifically, by communicating with the extension terminal via a network interface and receiving the information of the interruptible load sent by the extension terminal through GOOSE communication, rapid load collection is achieved. The voltage, current and a switch signal of interruptible load are obtained by the extension terminal through cables. The load shedding instruction is sent to the extension terminal through GOOSE communication so that the extension terminal controls the interruptible load, i.e., so that the extension terminal controls to shed the interruptible load according to the load shedding instruction sent by the master terminal. The method can expand the capacity of the interruptible load of a single user, can effectively reduce the terminal scale of the source grid load system, and is of great significance especially for large user-extending communication solutions.

In an embodiment, based on the above embodiment, the method further includes: the information of the interruptible load sent by a grid load subunit is received; and the load shedding instruction or a load restoring instruction is sent to the grid load subunit so that the grid load subunit controls the interruptible load.

Specifically, by communicating with the grid load subunit via the network interface, the information of the interruptible load sent by the grid load subunit is received through GOOSE communication, thereby realizing load collection. The information of the interruptible load is collected by an intelligent instrument and then connected to the grid load subunit. The load shedding instruction or a load restoring instruction is sent to the grid load subunit through GOOSE communication so that the grid load subunit controls the interruptible load, i.e., the grid load subunit directly outputs or sends an output to the intelligent instrument to control breaking and closing of a switch, thereby realizing rapid load control. The method can expand the capacity of the interruptible load of a single user, can effectively reduce the terminal scale of the source grid load system, and is of great significance especially for large user-extending communication solutions.

In an embodiment, by means of communication between a serial port and the intelligent instrument via Modbus protocol, the information of the interruptible load uploaded by the intelligent instrument is directly collected. The load shedding instruction is sent to the intelligent instrument through communication of Modbus protocol, thereby realizing load shedding control. Preferably, a flexible extension terminal or grid load subunit is preferred when a plurality of dispersed interruptible load lines are connected, and a low-cost serial port communication solution is preferred when a small quantity of dispersed interruptible load lines are connected, so as to satisfy the requirement for real-time control. The method provided by the present embodiment solves the problems of dispersion of large user interruptible loads and difficulty in realizing direct access of terminal control, designs three flexible communication extension solutions that can be combined with the number and the scale of interruptible load lines and site installation conditions, considers control rapidness of load shedding and the economy of extended access, enhances the scale and the capacity of the large user interruptible loads, and expands the application range of the grid load terminal.

In an embodiment, based on the above embodiment, the method further includes: bus voltage is collected and grid frequency and frequency slip are calculated in real time; the change of the grid frequency is determined; and load shedding is controlled through a sequential-round load shedding control mode or an independent-round load shedding control mode if the grid frequency drops.

Specifically, the bus voltage is collected and the grid frequency and the frequency slip are calculated in real time according to the collected bus voltage, so as to identify the change of the grid frequency, thereby identifying the drop rate of the grid frequency. After the grid frequency drops, load shedding is controlled through the sequential-round load shedding control mode or the independent-round load shedding control mode according to the current frequency drop and slip and the action setting value, so as to rapidly shed a large load, avoid the delay of load shedding of the master station, actively shed the interruptible load, effectively solve the error loss of the load shedding instruction of the master station, more accurately and selectively shed the load and avoid shedding more loads.

In an embodiment, the sequential-round load shedding control mode includes: the sequential-round load shedding control is adopted with different frequency drop depths and frequency slip speeds according to a preset grid frequency setting value and a frequency slip setting value. The independent-round load shedding control mode includes: an independent frequency action setting value is set for each round according to the frequency drop depth and multiple rounds load shedding control are set for different frequency drop depths.

Specifically, with respect to the frequency drop depths, a multi-round load shedding implementation solution is flexibly set at the terminal side, so as to rapidly shed a large load, avoid the delay of load shedding of the master station, actively shed the interruptible load, avoid the error loss of the load shedding instruction of the master station, more accurately and selectively shed the load and avoid shedding more loads, thereby realizing refined control of the frequency and increase accuracy of load shedding and control flexibility.

Figure 3:
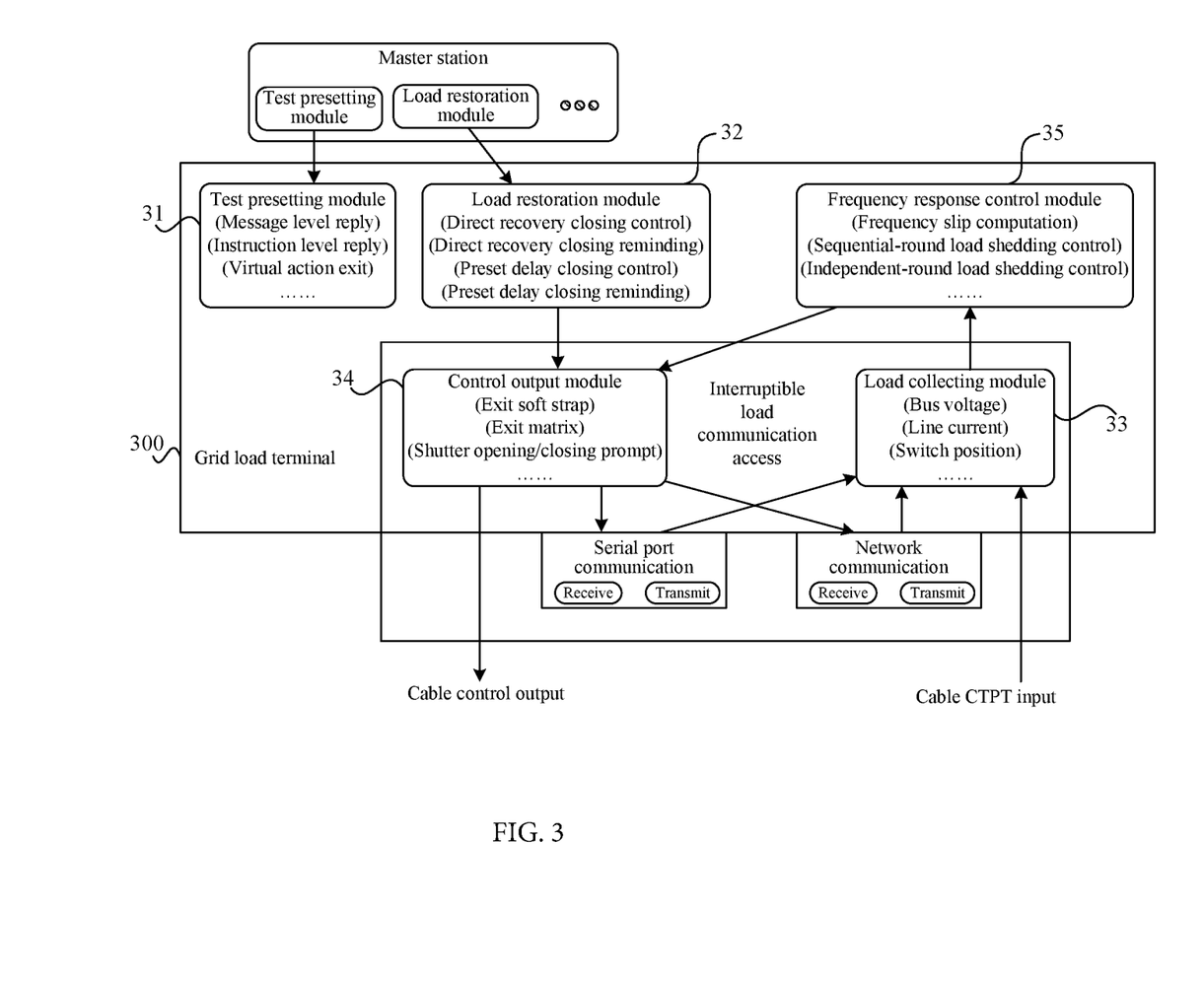
FIG. 3 is a schematic diagram illustrating a grid load interactive control terminal based on adaptive load characteristics according to an embodiment of the present invention.

FIG. 3 is a schematic diagram illustrating a grid load interactive control terminal based on adaptive load characteristics according to an embodiment of the present invention. By referring to FIG. 3, the grid load interactive control terminal 300 based on adaptive load characteristics in the embodiment of the present invention, i.e., the grid load terminal, includes a test presetting module 31, a load restoration module 32, a control output module 34, a load collecting module 33 and a frequency response control module 35.

The test presetting module 31 is configured to: receive a test presetting message sent by a master station and send message reply information to the master station, where the test presetting message includes a test presetting instruction; parse the test presetting message to obtain the test presetting instruction; build a test environment and generate a virtual action exit under the test environment when the test presetting instruction generates a record; and send instruction response including the record to the master station so that the master station determines whether a test is successful or not according to the record.

The load restoration module 32 is configured to: receive a direct power restoring instruction sent by the master station, where the direct power restoring instruction includes a control restoring instruction and a restoring reminding signal; execute a power shutter closing control according to the control restoring instruction if restoring power to a current line is allowed; and send the restoring reminding signal to an alarm device if restoring power to the current line is not allowed, so that the alarm device sends out alarm information. Alternatively, the load restoration module 32 is configured to: receive a power restoring delay instruction sent by the master station, where the power restoring delay instruction includes a preset delay time, a control restoring instruction and a restoring reminding signal; reset a timer and start timing; control the timer to stop timing when the time of the timer exceeds the preset delay time; execute the power shutter closing control according to the control restoring instruction if restoring power to the current line is allowed; and send the restoring reminding signal to the alarm device if restoring power to the current line is not allowed, so that the alarm device sends out the alarm information.

The load collecting module 33 is configured to receive information of an interruptible load sent by an extension terminal through GOOSE communication; or receive information of an interruptible load sent by a grid load subunit.

The control output module 34 is configured to send a load shedding instruction to the extension terminal through GOOSE communication so that the extension terminal controls the interruptible load; or send the load shedding instruction or a load restoring instruction to the grid load subunit so that the grid load subunit controls the interruptible load.

The frequency response control module 35 is configured to: collect bus voltage and calculate grid frequency and frequency slip in real time; determine the change of the grid frequency; and control load shedding through a sequential-round load shedding control mode or an independent-round load shedding control mode if the grid frequency drops.

The grid load interactive control terminal based on adaptive load characteristics provided by an embodiment of the present invention includes the test presetting module, the load restoration module, the control output module, the load collecting module and the frequency response control module. The grid load interactive control terminal based on adaptive load characteristics in the embodiment of the present invention supports large-scale test presetting, can directly verify whether the test is successful or not, can realize online, batch and safe tests, thereby providing a convenient means for load shedding tests of new users, verification of the new functional of the master station and the terminal, and subsequent routine tests. In addition, the grid load interactive control terminal provides multiple types of rapid load restoring and reminding, multiple load lines which can be flexibly connected, autonomously responding to frequency drop load control. The grid load interactive control terminal adapts to different power consumption scales of the users, supports optional load restoring, flexibly connects dispersed interruptible load, responds to the site sequential-round load shedding or an independent and rapid load shedding function of grid frequency drop, and increases a grid load interaction means, thereby improving the interaction control level.

In an embodiment, the load collecting module 33 and the control output module 34 constitute a flexible collecting and control module for dispersed and low-voltage interruptible loads. The flexible collecting and control module for dispersed and low-voltage interruptible loads is configured to flexibly select a collecting and control mode based on communication of the extension terminal, the grid load subunit and the intelligent instrument, according to the distribution condition of user loads, the number of load accesses and the number of accessed low-voltage loads. Collection and control of communication based on the extension terminal and the grid load subunit are realized through a network interface, and collection and control of communication based on the intelligent instrument are realized through a serial port.

The flexible collecting and control module for dispersed and low-voltage interruptible loads is also used for collection and control of communication based on the extension terminal, which is realized by "1 master terminal+multiple slave terminals". Load collection and control are realized through GOOSE communication protocol. The extension terminal directly collects the load and sends the load data to the master terminal via GOOSE protocol. The extension terminal controls the connected interruptible load by receiving the GOOSE load shedding instruction sent by the master terminal. Collection and control of communication based on the grid load subunit are realized by "1 master terminal+ multiple grid load subunits". Load collection and control of the master terminal are realized through GOOSE protocol communication. The grid load subunit collects the load data from the intelligent instrument on the line via the serial port and sends the load shedding instruction to the intelligent instrument through the serial port to realize the load control. Collection and control of communication based on the intelligent instrument are realized by "1 master terminal+ multiple intelligent instruments". Load collection of the master terminal line is realized through Modbus protocol communication of the serial port; and the load shedding instruction is sent to the intelligent instrument through the serial port to realize load control.

The grid load interactive control terminal based on adaptive load characteristics in the embodiment of the present invention includes: the test presetting module (i.e., an online, batch and safe test presetting module), the load restoration module (i.e., a load rapid recovery module between the master station and the terminal). The test presetting module builds a load shedding test environment, and solves the safety problem of online batch terminal testing through message reply, instruction reply and the virtual action exit. The load restoration module can realize direct power restoring and shutter closing control as well as direct power restoring and shutter closing reminding based on a direct power restoring instruction of the master station; and can also realize delay power restoring and shutter closing control as well as delay power restoring and shutter closing reminding based on delay power restoring with preset delay time. The flexible collecting and control module for dispersed and low-voltage interruptible loads is constituted by the load collecting module and the control output module, and realizes collection and control of communication with the extension terminal, the grid load subunit and the intelligent instrument based on the distribution of the user loads and the number of the low-voltage loads. The autonomous response frequency control module realizes rapid load shedding and refined frequency control based on the frequency collected by the terminal and the change rate of the frequency. The grid load interactive control terminal based on adaptive load characteristics in the embodiment of the present invention solves the safety and timeliness problems of power restoring, enhances the adaptive capability of load control, expands the number of connectable loads, increases the flexibility of load control, realizes autonomous frequency response load control, improves the accuracy of load control, solves the problem of online tests of massive users, and provides a functional verification means for access of new user terminals, system function upgrade and routine tests.

Based on the above embodiment, the present embodiment further provides a computer readable storage medium which stores a computer program. The computer program stores instructions. When executed by a processor of the grid load interactive control terminal based on adaptive load characteristics, the instructions implement the grid load interactive control method based on adaptive load characteristics in any embodiment of the present invention. The method includes: a test presetting message sent by a master station is received and message reply information is sent to the master station, where the test presetting message includes a test presetting instruction; the test presetting message is parsed to obtain the test presetting instruction; a test environment is built and a virtual action exit is generated under the test environment when the test presetting instruction generates a record; and instruction response including the record is sent to the master station so that the master station determines whether a test is successful or not according to the record.

Of course, computer executable instructions in the computer readable storage medium provided by embodiments of the present invention are not limited to the above operation of the grid load interactive control method based on adaptive load characteristics, and can also execute related operation in the grid load interactive control method based on adaptive load characteristics provided by any embodiment of the present invention, and has corresponding functions and beneficial effects.

Through the above description for embodiments, those skilled in the art can clearly understand that the present invention can be achieved by means of software and necessary universal hardware, and of course, can also be achieved through hardware. However, in many cases, the former is a better embodiment. Based on such understanding, the technical solution of the present invention can be reflected in a form of a software product in essence or in a part of making a contribution to the existing art. The software product can be stored in a readable storage medium, such as a read-only memory (ROM), a random access memory (RAM), a flash and the like of the grid load interactive control terminal of adaptive load characteristics, including several instructions to enable one grid load interactive control terminal device of adaptive load characteristics to execute the grid load interactive control method of adaptive load characteristics in embodiments of the present invention.

It should be noted that, the above only describes exemplary embodiments of the present invention and applied technical principles. The person having ordinary skill in the art shall understand that the present invention is not limited to specific embodiments described herein. For those skilled in the art, various apparent variations, readjustments and replacements can be made without departing from a protection scope of the present invention. Therefore, although the present invention is described in detail through the above embodiments, the present invention is not limited to the above embodiments and may further include more other equivalent embodiments without departing from the concept of the present invention, while the scope of the present invention is decided by a scope of attached claims.

What is claimed is:

1. A grid load interactive control method based on adaptive load characteristics, comprising:
receiving, by a grid load terminal, a test presetting message sent by a master station and sending message reply information to the master station, wherein the test presetting message comprises a test presetting instruction;
parsing, by the grid load terminal, the test presetting message to obtain the test presetting instruction;
building, by the grid load terminal, a test environment, generating a virtual load shedding action exit in the test environment, generating a test presetting record; and
sending, by the grid load terminal, instruction response comprising the test presetting record to the master station so that the master station determines whether a test is successful according to the test presetting record;
the method further comprises:
receiving a direct power restoring instruction sent by the master station, wherein the direct power restoring instruction comprises a control restoring instruction and a restoring reminding signal; executing a shutter closing control according to the control restoring instruction in response to determining that restoring power to a current line is allowed; and sending the restoring reminding signal to an alarm device in response to determining that restoring power to the current line is not allowed, so that the alarm device sends alarm information; or
receiving a power restoring delay instruction sent by the master station, wherein the power restoring delay instruction comprises a preset delay time, a control restoring instruction and a restoring reminding signal; resetting a timer and starting timing; controlling the timer to stop timing when the time of the timer exceeds the preset delay time; executing a shutter closing control according to the control restoring instruction in response to determining that restoring power to a current line is allowed; and sending the restoring reminding signal to the alarm device in response to determining that restoring power to the current line is not allowed, so that the alarm device sends the alarm information.

2. The method according to claim 1, wherein the restoring reminding signal comprises: a voice output signal and/or a control output signal.

3. The method according to claim 1, further comprising:
receiving information of an interruptible load sent by an extension terminal through generic object oriented substation event (GOOSE) communication; and
sending a load shedding instruction to the extension terminal through GOOSE communication so that the extension terminal controls the interruptible load.

4. The method according to claim 1, further comprising:
receiving information of an interruptible load sent by a grid load subunit; and
sending a load shedding instruction or a load restoring instruction to the grid load subunit so that the grid load subunit controls the interruptible load.

5. The method according to claim 1, further comprising:
collecting bus voltage and calculating grid frequency and frequency slip in real time;
determining change of the grid frequency; and
performing load shedding according to a sequential-round load shedding control mode or an independent-round load shedding control mode in response to determining that the grid frequency drops.

6. The method according to claim 5, wherein
the sequential-round load shedding control mode comprises: adopting the sequential-round load shedding control with different frequency drop depths and frequency slip speeds according to a preset grid frequency setting value and a frequency slip setting value; and
the independent-round load shedding control mode comprises: setting an independent frequency action setting value for each round according to the frequency drop depth and setting multiple rounds of load shedding control for different frequency drop depths.

7. A terminal in a power grid, comprising:
a processor; and
a memory connected to the processor for storing instructions executable by the processor,
wherein execution of the instructions by the processor causes the processor to execute a grid load interactive control method based on adaptive load characteristics, wherein the method comprises:
receiving a test presetting message sent by a master station and sending message reply information to the master station, wherein the test presetting message comprises a test presetting instruction;
parsing the test presetting message to obtain the test presetting instruction;
building a test environment, generating a virtual load shedding action exit in the test environment, generating a test presetting record; and
sending instruction response comprising the test presetting record to the master station so that the master station determines whether a test is successful according to the test presetting record;
the method further comprises:
receiving a direct power restoring instruction sent by the master station, wherein the direct power restoring instruction comprises a control restoring instruction and a restoring reminding signal; executing a shutter closing control according to the control restoring instruction in response to determining that restoring power to a current line is allowed; and sending the restoring reminding signal to an alarm device in response to determining that restoring power to the current line is not allowed, so that the alarm device sends alarm information; or receiving a power restoring delay instruction sent by the master station, wherein the power restoring delay instruction comprises a preset delay time, a control restoring instruction and a restoring reminding signal; resetting a timer and starting timing; controlling the timer to stop timing when the time of the timer exceeds the preset delay time; executing a shutter closing control according to the control restoring instruction in response to determining that restoring power to a current line is allowed; and sending the restoring reminding signal to the alarm device in response to determining that restoring power to the current line is not allowed, so that the alarm device sends the alarm information.

8. The terminal according to claim 7, wherein the restoring reminding signal comprises: a voice output signal and/or a control output signal.

9. The terminal according to claim 7, wherein the method further comprises:
receiving information of an interruptible load sent by an extension terminal through generic object oriented substation event (GOOSE) communication; and
sending a load shedding instruction to the extension terminal through GOOSE communication so that the extension terminal controls the interruptible load.

10. The terminal according to claim 7, wherein the method further comprises:
receiving information of an interruptible load sent by a grid load subunit; and
sending a load shedding instruction or a load restoring instruction to the grid load subunit so that the grid load subunit controls the interruptible load.

11. The terminal according to claim 7, wherein the method further comprises:
collecting bus voltage and calculating grid frequency and frequency slip in real time;
determining change of the grid frequency; and
performing load shedding according to a sequential-round load shedding control mode or an independent-round load shedding control mode in response to determining that the grid frequency drops.

12. The terminal according to claim 11, wherein the method further comprises:
the sequential-round load shedding control mode comprises: adopting the sequential-round load shedding control with different frequency drop depths and frequency slip speeds according to a preset grid frequency setting value and a frequency slip setting value; and
the independent-round load shedding control mode comprises: setting an independent frequency action setting value for each round according to the frequency drop depth and setting multiple rounds of load shedding control for different frequency drop depths.

13. A non-transitory computer readable storage medium, storing a computer program, wherein the computer program, when executed by a processor, realizes a grid load interactive control method based on adaptive load characteristics, wherein the method comprises:
receiving a test presetting message sent by a master station and sending message reply information to the master station, wherein the test presetting message comprises a test presetting instruction;
parsing the test presetting message to obtain the test presetting instruction;
building a test environment, generating a virtual load shedding action exit in the test environment, generating a test presetting record; and
sending instruction response comprising the test presetting record to the master station so that the master station determines whether a test is successful according to the test presetting record;
the method further comprises:
receiving a direct power restoring instruction sent by the master station, wherein the direct power restoring instruction comprises a control restoring instruction and a restoring reminding signal; executing a shutter closing control according to the control restoring instruction in response to determining that restoring power to a current line is allowed; and sending the restoring reminding signal to an alarm device in response to determining that restoring power to the current line is not allowed, so that the alarm device sends alarm information; or
receiving a power restoring delay instruction sent by the master station, wherein the power restoring delay instruction comprises a preset delay time, a control restoring instruction and a restoring reminding signal; resetting a timer and starting timing; controlling the timer to stop timing when the time of the timer exceeds the preset delay time; executing a shutter closing control according to the control restoring instruction in response to determining that restoring power to a current line is allowed; and sending the restoring reminding signal to the alarm device in response to determining that restoring power to the current line is not allowed, so that the alarm device sends the alarm information.

* * * * *